US012738406B2

(12) United States Patent
Kshirsagar et al.

(10) Patent No.: US 12,738,406 B2
(45) Date of Patent: Sep. 15, 2026

(54) INDUCTOR CONNECTIVITY AND ASSEMBLIES

(71) Applicant: Infineon Technologies Austria AG, Villach (AT)

(72) Inventors: Kushal Kshirsagar, Fremont, CA (US); Eung San Cho, Torrance, CA (US); Luca Peluso, Villach (AT); Danny Clavette, Greene, RI (US); Angela Kessler, Sinzing (DE)

(73) Assignee: Infineon Technologies Austria AG, Villach (AT)

( * ) Notice: Subject to any disclaimer, the term of this patent is extended or adjusted under 35 U.S.C. 154(b) by 828 days.

(21) Appl. No.: 18/100,281

(22) Filed: Jan. 23, 2023

(65) Prior Publication Data

US 2024/0249870 A1 Jul. 25, 2024

(51) Int. Cl.
*H01F 27/22* (2006.01)
*H01F 41/02* (2006.01)

(52) U.S. Cl.
CPC ............ *H01F 27/22* (2013.01); *H01F 41/02* (2013.01)

(58) Field of Classification Search
CPC ........................................................ H01F 27/22
See application file for complete search history.

(56) References Cited

U.S. PATENT DOCUMENTS

| | | | | |
|---|---|---|---|---|
| 7,875,498 B2 * | 1/2011 | Elbanhawy | H01L 25/16 | 438/109 |
| 11,417,593 B2 * | 8/2022 | Elsherbini | H01L 21/6835 | |
| 11,800,633 B2 * | 10/2023 | Liang | H01F 17/00 | |
| 2020/0373217 A1 | 11/2020 | Zhang et al. | | |
| 2023/0420173 A1 * | 12/2023 | Clavette | H01F 17/04 | |

OTHER PUBLICATIONS

Babijak, Samuel, et al., "A Perfect Match: Power Losses in Buck Converters and How to Increase Efficiency", Jun. 10, 2022, pp. 1-6, Retrieved from the Internet: URL:https://media.monolithicpower.com/.

Extended European Search Report, EP 24 15 3245, Jun. 19, 2024, pp. 1-11.

* cited by examiner

*Primary Examiner* — Mukundbhai G Patel
(74) *Attorney, Agent, or Firm* — Armis IP Law, LLC

(57) ABSTRACT

An apparatus and method as discussed herein includes a heat sink element fabricated from electrically conductive material. A first element of electrically conductive material may be fixedly connected to the heat sink element. A second element of electrically conductive material may be fixedly connected to the heat sink element. The first element and the second element may extend substantially orthogonal from a surface of the heat sink element.

26 Claims, 13 Drawing Sheets

FIG. 1
(SIDE VIEW)

FIG. 5

(SIDE VIEW)

(TOP VIEW)

(3-D VIEW)

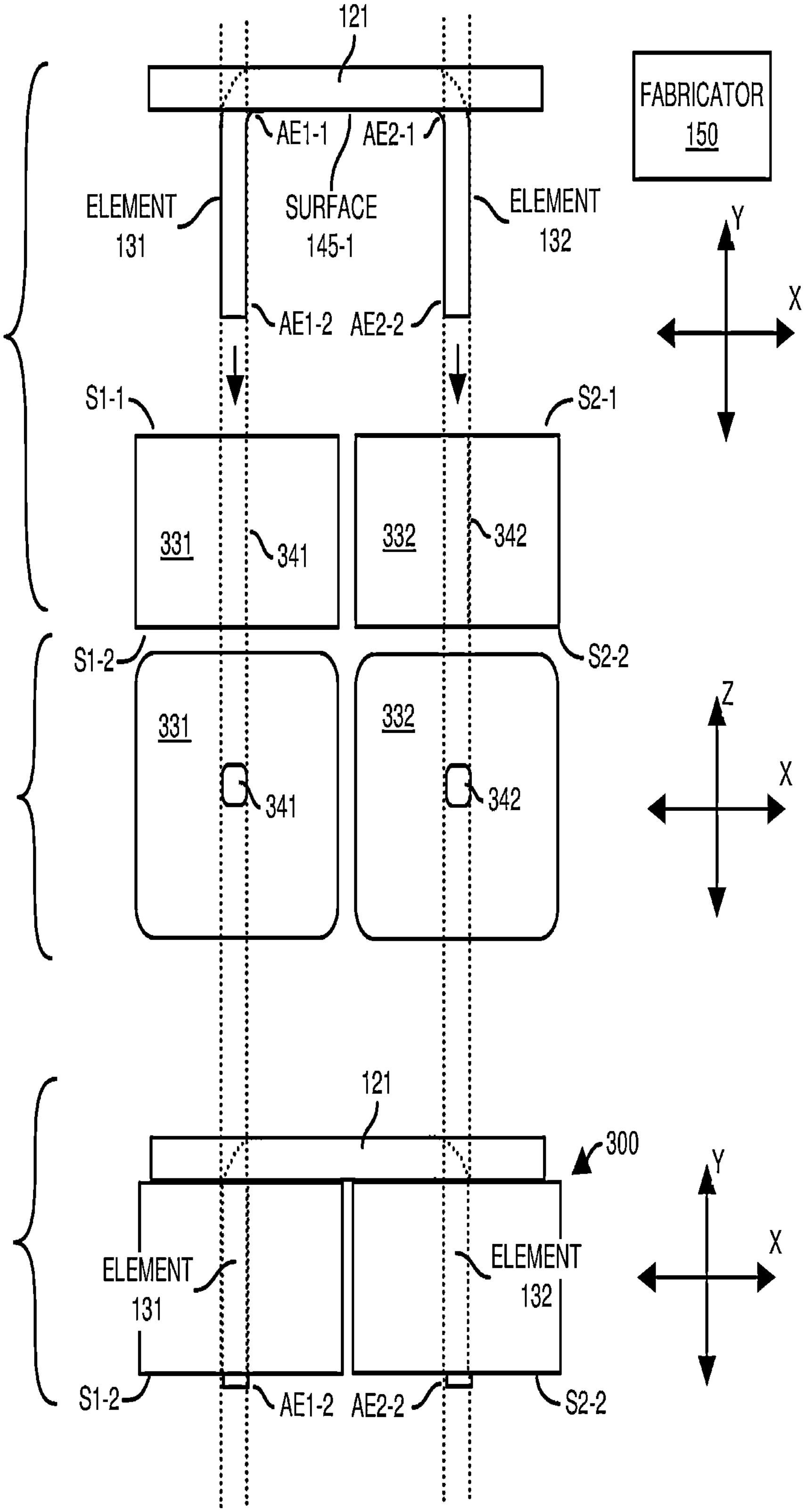
FIG. 3A (SIDE VIEW)
FIG. 3B (TOP VIEW)
FIG. 3C (SIDE VIEW)

(SIDE VIEW)

(SIDE VIEW)

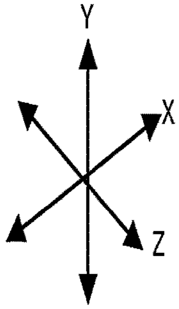
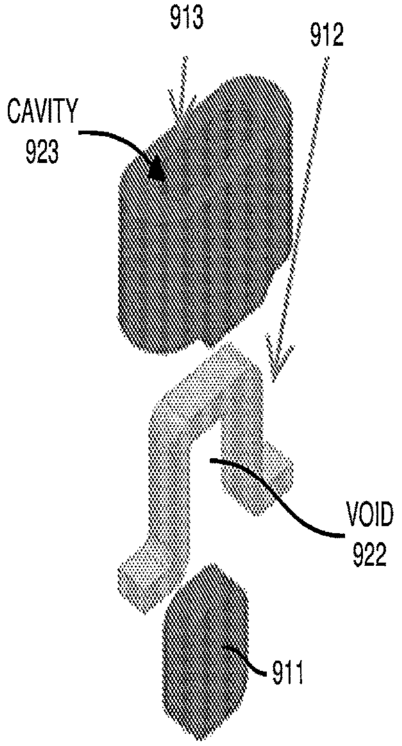
FIG. 9A
(3-D VIEW)
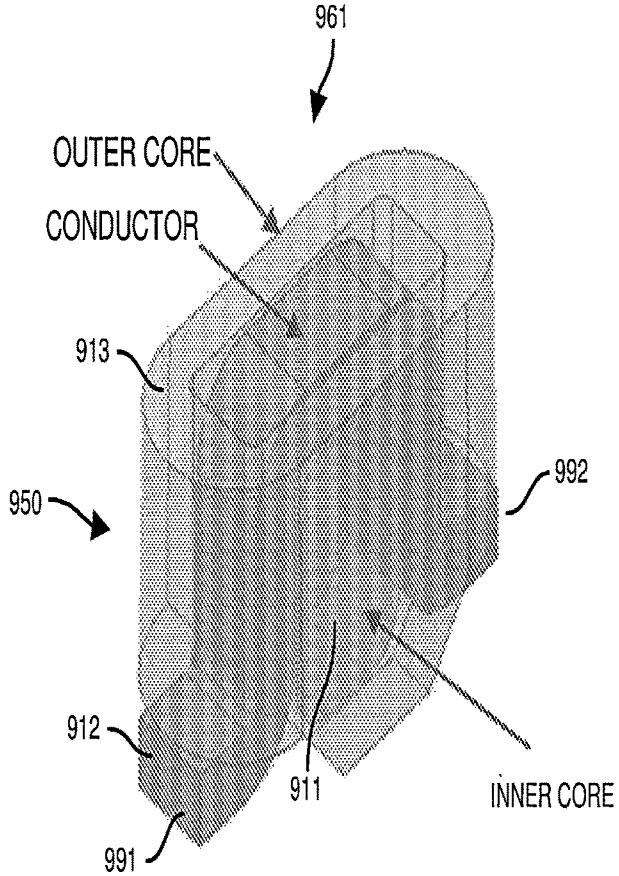
FIG. 9B
(3-D VIEW)

(TOP VIEW)

(CUTAWAY SIDE VIEW A to A')

INDUCTOR CONNECTIVITY AND ASSEMBLIES

BACKGROUND

A printed circuit board (PCB) or printed wiring board is a laminated structure of conductive layers separated by insulating layers. In general, PCBs have two functions. The first is to secure electronic components at designated locations on the outer layers of the PCB by means of affixing such as soldering. The electronic circuit instantiated by the populated circuit board is designed to provide one or more specific functions. After fabrication, the electronic circuit is powered to perform the desired functions.

Typically, a printed circuit board is a planar device on which multiple components are interconnected via traces to provide the functions as previously discussed. Such implementations of fabricating circuitry on a planar circuit board assembly is dimensionally limited, preventing high density implementation of circuitry. In a conventional circuit base station implementation, respective circuit components are prone to damage based on generated heat by a circuit component itself or nearby circuit components.

In any given available space for Power Module, maximizing the volume utilized by the power components, maximizing the inductance, and maximizing the cooling performance is very desirable and challenging at the same time.

BRIEF DESCRIPTION

Implementation of clean energy (or green technology) is very important to reduce our impact as humans on the environment. In general, clean energy includes any evolving methods and materials to reduce an overall toxicity of energy consumption on the environment.

This disclosure includes the observation that raw energy, such as received from green energy sources or non-green energy sources, typically needs to be converted into an appropriate form (such as desired AC voltage, DC voltage, etc.) before it can be used to power end devices such as servers, computers, mobile communication devices, etc. Regardless of whether energy is received from green energy sources or non-green energy sources, it is desirable to make most efficient use of raw energy provided by such systems to reduce our impact on the environment. This disclosure contributes to reducing our carbon footprint (and green energy) via more efficient energy conversion and circuit implementations supporting same.

Conventional power modules as previously discussed typically have a big chunk of unused volume, which results in low inductance and also poor cooling performance. The techniques address such issues by maximizing the volume utilized with inductor thereby increasing the inductance and also cooling performance. This disclosure includes various ways to maximize inductance and provide novel cooling associated with same.

As discussed herein, a fabricator produces one or more assemblies to produce higher density circuitry than provided by conventional instantiation of circuitry on planar circuit boards.

More specifically, this disclosure includes an apparatus, systems, methods, etc. The apparatus (such as an assembly, component, part, circuit, device, etc.) may include: a heat sink element fabricated from electrically conductive material; a first element of electrically conductive material fixedly connected to the heat sink element; and a second element of electrically conductive material fixedly connected to the heat sink element. The first element and the second element can be fabricated to extend substantially orthogonal from a surface of the heat sink element.

The apparatus as discussed herein may further comprise: magnetic permeable material including: i) a first void extending between a first surface of the magnetic permeable material and a second surface of the magnetic permeable material; and ii) a second void extending between the first surface of the magnetic permeable material and the second surface of the magnetic permeable material. The first element of the electrically conductive material may reside in the first void in the magnetic permeable material; the second element of the electrically conductive material may reside in the second void in the magnetic permeable material.

The first element of the apparatus may be a first bent portion of the electrically conductive material from which the heat sink element is fabricated; the second element of the apparatus may be a second bent portion of the electrically conductive material from which the heat sink element is fabricated.

In still further examples, axial ends of the heat sink element can be configured to extend in a plane beyond or overhang with respect to the first element and the second element of the assembly.

The first element of the apparatus may include a first axial end and a second axial end. The first axial end of the first element may be fixedly coupled to the heat sink element. The second axial end of the first element may be an input node connected to power switch circuitry of a power converter circuit. The second element of the apparatus may include a first axial end and a second axial end. The first axial end of the second element may be fixedly coupled to the heat sink element.

Still further, the second axial end of the second element may be an output node associated with the power converter circuit. In accordance with a further example, a combination of the heat sink element, the first element, and the second element may be disposed in an assembly in which the first element is a first inductive path and the second element is a second inductive path. The first inductive path may be connected in series with the second inductive path via a portion of the heat sink element extending between the first axial end of the first element and the first axial end of the second element.

As previously discussed, the apparatus as discussed herein can be configured to include a first switch disposed in series with a second switch. The input node of the apparatus may be configured to directly couple the first switch to the second switch. The apparatus may be configured to further include driver circuitry to drive each of the first switch and the second switch.

Still further, the apparatus as discussed herein can be configured to include a host substrate. As previously discussed, the first element may include a first axial end and a second axial end. The first axial end of the first element may be fixedly coupled to the heat sink element. The second axial end of the first element may be fixedly connected to a first node of the host substrate. The second element of the apparatus can be configured to include a first axial end and a second axial end. The first axial end of the second element may be fixedly coupled to the heat sink element. The second axial end of the second element may be fixedly connected to a second node of the host substrate. The first element may convey heat from the host substrate to the heat sink element; the second element may convey heat from the host substrate to the heat sink element.

Yet further, examples of the apparatus may include a first mass of magnetic permeable material disposed between the first element of electrically conductive material and the second element of electrically conductive material. The apparatus may further include a second mass of magnetic permeable material including a hollow volume in which a combination of the first element, the second mass of magnetic permeable material, and the second element reside.

The heat sink element as discussed herein (such as from a top view) may be substantially H-shaped as viewed along an axial length of the first element of electrically conductive material or second element.

Additionally, note that the heat sink element may be configured to include a first void resulting from bending of the first element with respect to a plane in which the heat sink element resides; the heat sink element of the apparatus may be configured to include a second void resulting from bending of the second element with respect to the plane in which the heat sink element resides.

Note further that a first dimension of the first element of the apparatus as viewed along an axial length of the first element may be substantially equal to a thickness of the heat sink element; a second dimension of the first element of the apparatus as viewed along the axial length of the first element may be substantially greater than a thickness of the heat sink element, the first dimension orthogonal to the second dimension.

Further examples of the apparatus as discussed herein include a first substrate. The first element may be enveloped by first magnetic permeable material. The second element may be enveloped by second magnetic permeable material. As previously discussed, an axial end of the first element can be configured to contact a first node disposed on a surface of the first substrate. The apparatus can be configured to further include a second substrate to which the first substrate is affixed; in such an instance, an electrically conductive component (such as a clip or other suitable device) can be configured to provide electrical connectivity between an axial end of the second element and the second substrate. The electrically conductive component can be configured to provide electrical connectivity between the axial end of the second element and a second node of the first substrate or connectivity to another substrate.

The apparatus as discussed herein may further include: magnetic permeable material enveloping the first element of electrically conductive material and the second element of electrically conductive material; a first substrate to which a first axial end of the first element is coupled; first circuit components coupled to the first substrate, the first circuit components operative to control a flow of current through a series circuit path of the first element, the heat sink element, and the second element; a second substrate to which the first substrate is affixed. One or more circuit components such as coupled to the second substrate may reside in a gap between the magnetic permeable material and the second substrate.

Yet further, the apparatus as discussed herein may include a host substrate and switch circuitry embedded in or on one or more host substrates. In such an instance, the switch circuitry can be configured to control a flow of current through a series combination of the first element, the heat sink element, and the second element.

Further embodiments herein include a method of producing a heat sink assembly, the method comprising: receiving a heat sink element, the heat sink element fabricated from electrically conductive material; fabricating the heat sink assembly to include a first element of electrically conductive material disposed substantially orthogonal to a surface of the heat sink element; and fabricating the heat sink assembly to include a second element of electrically conductive material disposed substantially orthogonal to the surface of the heat sink element.

As previously discussed, the first element may be a first bent portion of the electrically conductive material from which the heat sink element is fabricated; the second element may be a second bent portion of the electrically conductive material from which the heat sink element is fabricated. The method as discussed herein may further include: inserting the first element of electrically conductive material of the heat sink assembly through a first void disposed in first magnetic permeable material; and inserting the second element of electrically conductive material of the heat sink assembly through a second void disposed in second magnetic permeable material.

Note that this disclosure includes useful techniques. For example, in contrast to conventional techniques, the novel circuit as discussed herein provides multiple ways to fabricate high density circuitry via implementation of a unique heat sink-circuit path assembly.

Note further that any of the resources as discussed herein can include one or more computerized devices, apparatus, hardware, etc., execute and/or support any or all of the method operations disclosed herein. In other words, one or more computerized devices or processors can be programmed and/or configured to operate as explained herein to carry out the different techniques as described herein.

Other aspects of the present disclosure include software programs and/or respective hardware to perform any of the operations summarized above and disclosed in detail below.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of techniques herein (BRIEF DESCRIPTION) purposefully does not specify every novel aspect of the present disclosure or claimed invention(s). Instead, this brief description only presents general aspects and corresponding points of novelty over conventional techniques. For additional details and/or possible perspectives (permutations) of the invention(s), the reader is directed to the Detailed Description section (which is a summary) and corresponding figures of the present disclosure as further discussed below.

BRIEF DESCRIPTION OF THE DRAWINGS

FIG. 3A is an example side view diagram of a heat sink assembly and corresponding protruding elements being inserted into a respective one or more masses of magnetic permeable material as described herein.

FIG. 3B is an example top view diagram of magnetic permeable material as discussed herein.

FIG. 3C is an example side view diagram illustrating protruding elements of the heat sink assembly inserted into respective voids of the magnetic permeable material as described herein.

FIG. 9A is an example exploded 3-D diagram illustrating multiple components to fabricate a respective inductor assembly as described herein.

FIG. 9B is an example assembled 3-D diagram illustrating a fabricated inductor assembly as described herein.

Figure 1:
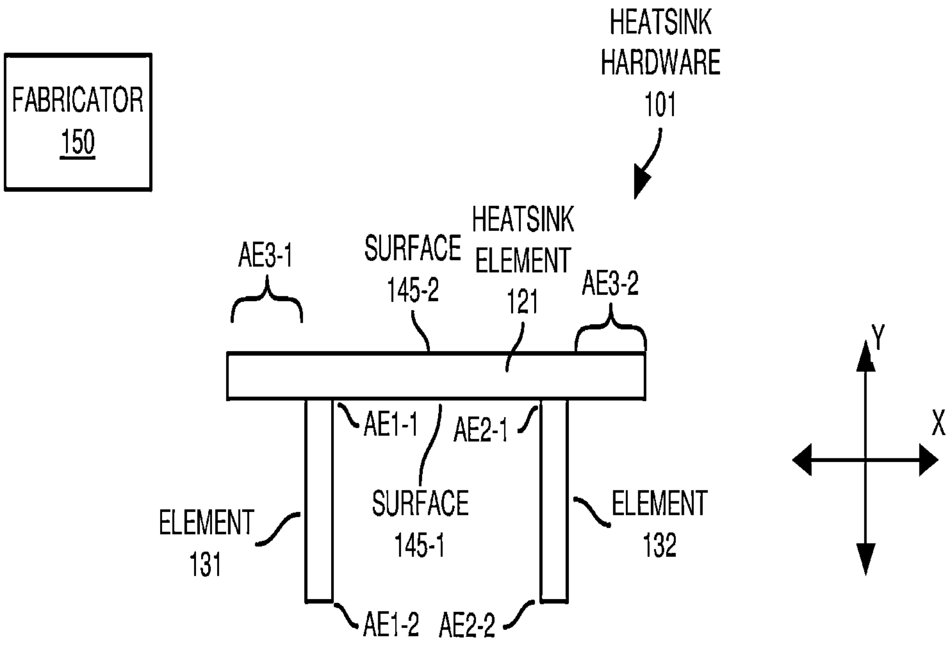
FIG. 1 is an example illustrating attributes of a heat sink assembly or heat sink hardware as discussed herein.

The foregoing and other objects, features, and advantages of the disclosed matter herein will be apparent from the following more particular description herein, as illustrated in the accompanying drawings in which like reference characters refer to the same parts throughout the different views. The drawings are not necessarily to scale, with emphasis instead being placed upon illustrating the principles, concepts, aspects, techniques, etc.

DETAILED DESCRIPTION

As previously discussed, this disclosure is useful over conventional techniques. For example, in contrast to conventional techniques, the novel assemblies as discussed herein support fabrication of high density circuits (such as power converter circuits) implementing inductive components.

Now, more specifically, FIG. 1 is an example illustrating attributes of a heat sink assembly or heat sink hardware as discussed herein.

As shown in FIG. 1, fabricator 150 or other suitable entity fabricates the heat sink hardware 101 (such as assembly, component, device, or other suitable entity) to include heat sink element 121, element 131, and element 132.

In this example, the heat sink element 121, element 131, and element 132, are fabricated via fabricator 150 from any suitable material such as one or more of electrically conductive material (such as metal), thermally conductive material, etc.

The protruding element 131 (such as substantially parallel or along axis Y) can be configured to include a first axial end AE1-1 and a second axial end AE1-2. The protruding element 132 (such as substantially parallel or along axis Y) can be configured to include a first axial end AE2-1 and a second axial end AE2-2.

The first axial end AE1-1 of the first element 131 of (electrically) conductive material may be fixedly connected to the surface 145-1 of the heat sink element 121. The first axial end AE2-1 of the second element 132 of electrically conductive material may be fixedly connected to the surface 145-1 of the heat sink element 121 as well. The combination of heat sink element 121, element 131, and element 132 may be a homogeneous mass of material such as metal.

As further shown, the first element 131 and the second element 132 can be configured to extend substantially orthogonal from (such as 90 degrees with respect to a plane of surface 145-1 or between 80 and 100 degrees or other suitable value with respect to) a surface 145-1 of the heat sink element 121.

In one example, axial ends AE3-1 and AE3-2 of the heat sink element 121 extend in a plane (such as in X-Z plane) beyond the first element 131 and the second element 132 to provide additional heat sink capability (e.g., larger area of surface 145-2 to dissipate heat at a higher rate) from the heat sink element 121. More specifically, axial end AE3-1 of the heat sink element 121 extends to the left beyond element 131 of the on the X-axis; axial end AE3-2 of the heat sink element 121 extends to the right beyond element 132 of the on the X-axis.

Figure 2A:
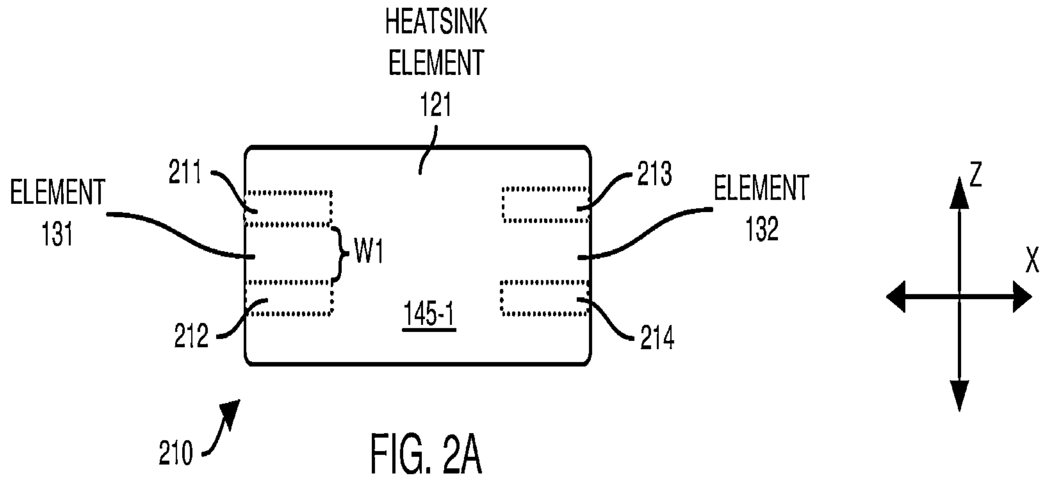
FIG. 2A is an example diagram illustrating a mass of electrically conductive material and corresponding fabrication of a respective heat sink assembly as described herein.

FIG. 2A is an example diagram illustrating mass of electrically conductive material and corresponding fabrication of a respective heat sink assembly as described herein.

The heat sink element 121 and corresponding heat sink hardware 101 can be fabricated in any suitable manner. For example, the fabricator 150 can be configured to receive a planar mass of material such as material 210 (such as electrically conductive material) with thickness in the Y-axis of T1. The fabricator 150 can be configured to remove a portion of the electrically conductive material 211, 212, 213, and 214 from the top surface 145-1 to the bottom surface 145-2 to produce respective voids. The fabricator 150 then bends the remaining element 131 and element 132 to be orthogonal with respect to the surface 145-1.

Note that the dimension (such as thickness T1) of the first element 131 as viewed along an axial length of the first element 131 in FIG. 2A may be substantially equal to a thickness of the heat sink element 121 in the Y-axis; and a second dimension (such as width W1) of the first element 131 as viewed along the axial length of the first element 131 may be selected to be substantially greater than or less than a thickness of the heat sink element 121 depending on selection of W1 when removing material from area 211. 212, 213, and 214. As further shown in FIG. 2B, the first dimension such as T1 in the Y-axis may be orthogonal to the second dimension W1 in the Z-axis.

Note further that it may be desired to reduce the DCR (DC or direct current resistance) of the conductive path. In such an instance, it may be desirable that the dimension W1 be less than a thickness T1 of the element 131. For example, assuming that the module height is not a limiting factor and the HS element 131 is very thick (such as 1 millimeter), the fabricator 150 can be configured to create dimension W1 to be less than the thickness T1; this allows the final inductor assembly to have more magnetic material (since the void's volume will be smaller) and therefore having higher inductance.

As another example, it may be desirable to achieve a certain minimum inductance associated with the inductor assembly (see assembly 300 in FIG. 3C). In this case, no matter how thick dimension T1 is, it may be necessary to reduce a size of dimension W1 smaller than the thickness T1 in order to reduce the void's volume and save magnetic material (see magnetic permeable material 331 and 332 in FIG. 3A, FIG. 3B, and FIG. 3C.

Figure 2B:
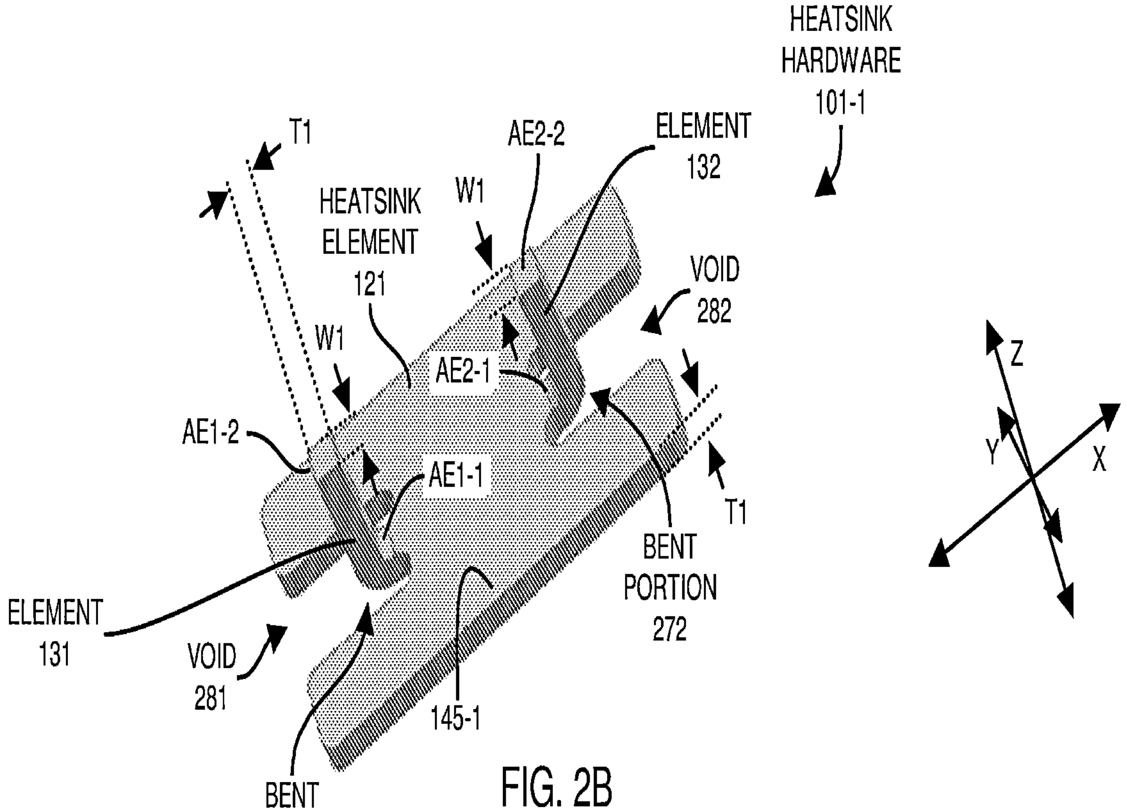
FIG. 2B is an example 3-D diagram illustrating a fabricated heat sink assembly as described herein.

FIG. 2B is an example 3-D diagram illustrating a fabricated heat sink assembly as described herein.

As previously discussed, the first element 131 may be a first bent portion of the electrically conductive material 210 from which the heat sink element 121 and corresponding heat sink hardware 101 are fabricated; the second element 132 may be a second bent portion of the electrically conductive material 210 from which the heat sink element 121 and corresponding heat sink hardware 101 are fabricated. Note further that the heat sink element 121 and corresponding heat sink hardware 101 can be configured to have any number of orthogonal protruding elements.

As previously discussed, bending of the element 131 results in creation of respective void 281; bending of the element 132 results in creation of respective void 282. Thus, the heat sink hardware 101-1 (such as instance of the heat sink hardware 101) can be configured to include: a first void 281 resulting from bending of the first element 131 with respect to a planar surface 145-1; a second void 282 resulting from bending of the first element 132 with respect to a planar surface 145-1.

Further in this example, the heat sink element 121 is substantially H-shaped as viewed along an axial length (such as Y-axis) of the first element 131 and the second element 132.

Yet further, note that bending of the element 131 and element 132 alleviates the need to make a solder or weld joint between the axial end AE1-1 of the element 131 and the surface 145-1 and alleviates the need to make a solder or weld joint between the axial end AE2-1 of the element 132 and the surface 145-1.

However, in accordance with further examples, the heat sink hardware 101 as discussed herein can be fabricated via receiving each of the heat sink element 121, element 131, and element 132. In one example, the fabricator 150 may provide connecting/coupling of the axial end AE1-1 of the element 131 to the surface 145-1 as well as connecting/coupling of the axial end AE2-1 of the element 131 to the surface 145-1. Thus, the heat sink hardware 101 can be fabricated in any of multiple different ways.

FIG. 3A is an example side view diagram of a heat sink assembly being inserted into a respective one or more masses of magnetic permeable material as described herein.

Note that the heat sink hardware 101 as discussed herein can be used to produce a respective inductor device via enveloping one or more of the protruding elements 131 and 132 with magnetic permeable material.

For example, the fabricator 150 may receive mass of magnetic permeable material 331 including a respective void 341 extending between top surface S1-1 and bottom surface S1-2; the fabricator 150 may receive mass of magnetic permeable material 332 including a respective void 342 extending between top surface S2-1 and bottom surface S2-2.

The fabricator 150 inserts the first element 131 of the electrically conductive material into the void 331 of the magnetic permeable material 331; the fabricator 150 inserts the second element 132 of the electrically conductive material into the void 332 of the magnetic permeable material 332. The insertion may happen simultaneously.

As shown in FIG. 3C, the combination of heat sink hardware 101 and the magnetic permeable material 331 and 332 results in heat sink inductor assembly 300 (such as an inductor device). For example, the electrically conductive paths such as protruding element 131 and protruding element 132 enveloped or surrounded by the corresponding magnetic permeable material (331, 332) transforms the respective electrically conductive paths of elements 131 and 132 into inductive paths. That is, magnetic flux associated with flow of current through the element 131 is contained by the magnetic permeable material 341; magnetic flux associated with flow of current through the element 132 is contained by the magnetic permeable material 342.

FIG. 3B is an example top view diagram of magnetic permeable material as discussed herein.

As shown, the void 341 in the magnetic permeable material 331 may be a drill hole (such as cylindrical) or other shape extending along the Y-axis; the void 342 may be a drill hole (such as cylindrical) or other shape extending along the Y-axis.

FIG. 3C is an example side view diagram illustrating protruding elements of the heat sink assembly inserted into respective voids of the magnetic permeable material as described herein.

As shown in this example, as a matter of design choice, the axial end AE1-2 of the element 131 may align with the respective surface S1-2 or extend beyond the surface S1-2; the axial end AE2-2 of the element 132 may align with the respective surface S2-2 or extend beyond the surface S2-2.

In this manner, the assembly 300 can be consider a split inductor providing unique heat sink capability. For example, the assembly 300 has an inductance based on presence of the magnetic permeable material surrounding each element 131 and 132. The dimensions and attributes (such as type of magnetic permeable material) of the components (element 131, element 132, heat sink element 121, etc.) can be varied to control the inductance of the assembly 300. The inductance of the assembly 300 is based on the first portion of inductance associated with inductive path (element 131) and the second portion of inductance associated with inductive path (element 132).

Figure 4A:
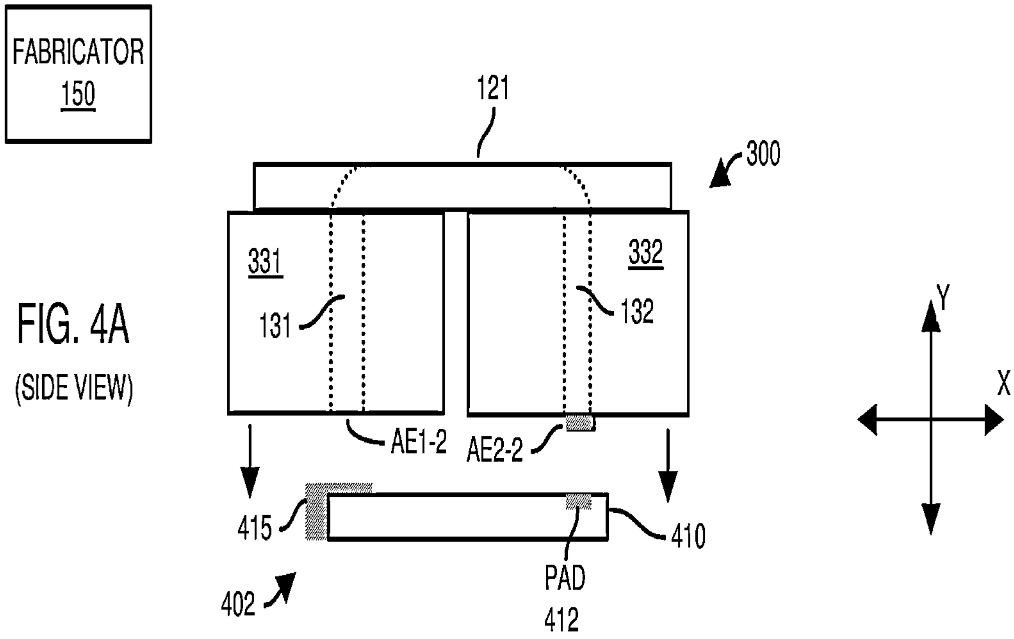
FIG. 4A is an example side view diagram illustrating affixing of an inductor assembly to a host substrate as described herein.
Figure 4B:
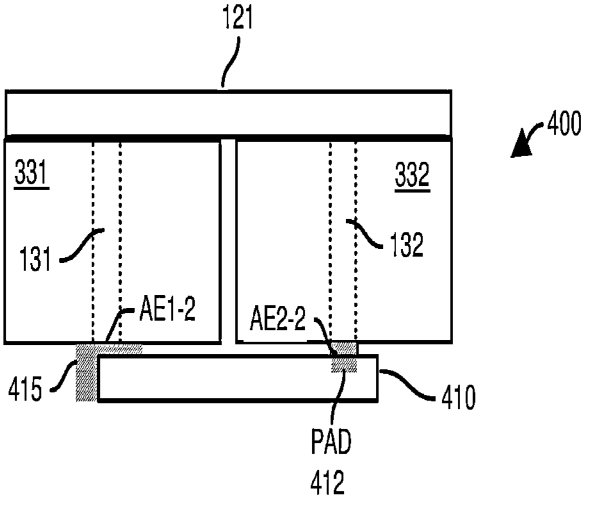
FIG. 4B is an example side view diagram illustrating an inductor assembly affixed to a respective host substrate as described herein.

FIG. 4A is an example side view diagram illustrating affixing of the inductor assembly to a host substrate as described herein. FIG. 4B is an example side view diagram illustrating an inductor assembly affixed to a respective host substrate as described herein.

In this example, the assembly 400 includes any suitable circuit components disposed on its one or more surfaces and/or embedded in the substrate 410. Fabricator 150 receives the heat sink inductor assembly 300 and affixes it to the substrate 410.

More specifically, to fabricate the assembly 400, the fabricator 150 can be configured to provide electrical connectivity between the axial end AE1-2 of the element 131 to the electrically conductive path 415 (such as fabricated from metal); the fabricator 150 can be configured to provide electrical connectivity between the axial end AE2-2 of the element 132 to the surface pad 412 (such as an electrically conductive path of the substrate 410). Thus, as shown in FIG. 4B, a combination of element 132, heat sink element 121, and element 131 can be a serial circuit path providing connectivity between the pad 412 and the electrically conductive path 415.

As further discussed herein, the assembly 400 can be configured to include one or more circuit components associated with a power converter, any portion of which is disposed on or embedded in the substrate 410 or other entity as further discussed herein.

Thus, the assembly 400 can be configured to include substrate 410. In such an instance, the element 131 is enveloped by magnetic permeable material 331; the element 132 is enveloped by magnetic permeable material 332. An axial end AE2-2 of the element 132 contacts the electrically conductive pad 412 (such as circuit node) disposed on a surface of the substrate 410. An axial end AE1-2 of the element 131 contacts the electrically conductive path 415 (such as circuit node, clip, etc.) disposed on or in contact with the surface of the substrate 410.

Figure 5:
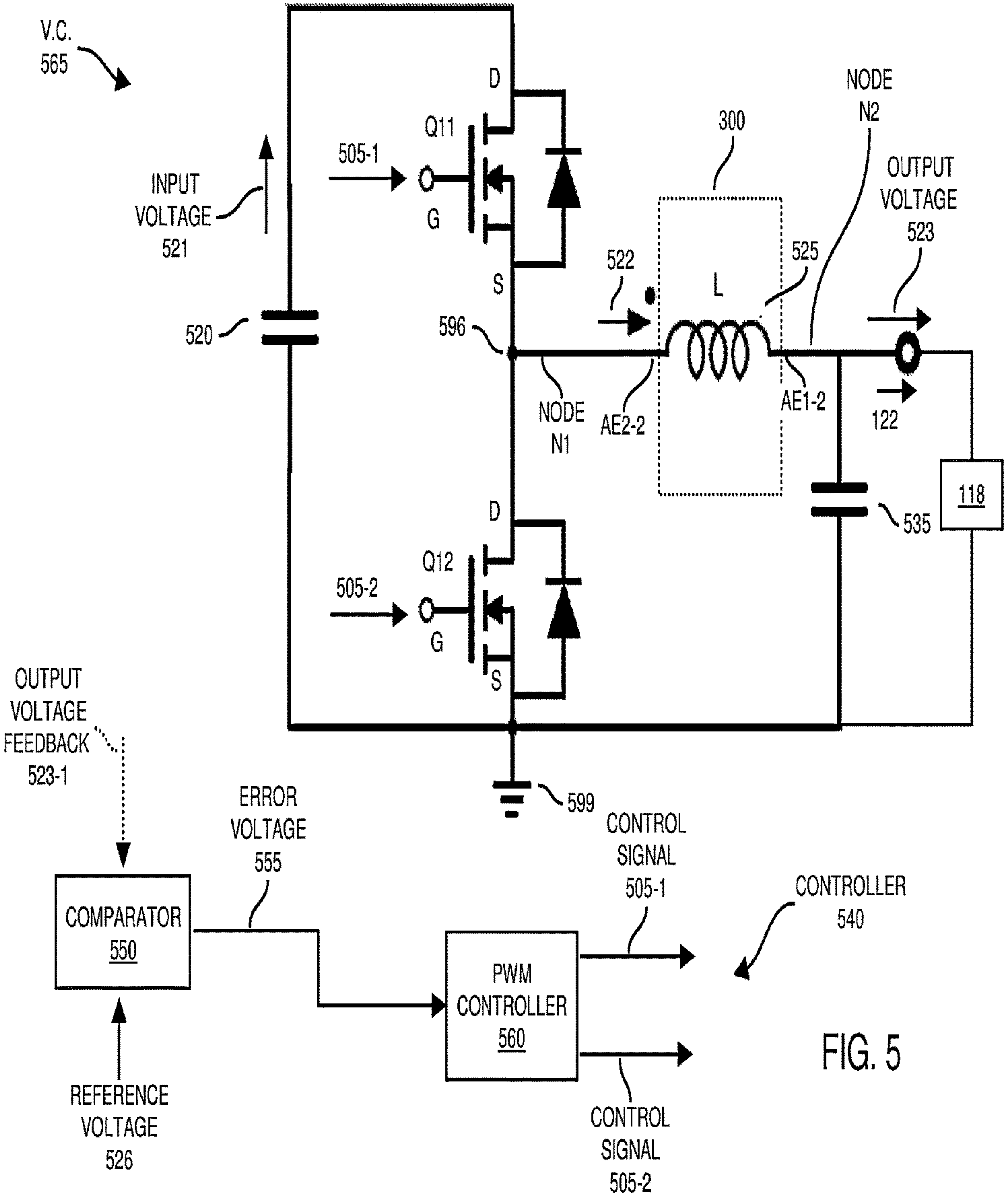
FIG. 5 is an example diagram illustrating components of a power converter including implementation of an inductive heat sink assembly as described herein.

FIG. 5 is an example diagram illustrating components of a power converter including an inductive heat sink assembly as described herein.

In this non-limiting example embodiment, the voltage converter 565 is configured as a buck converter including voltage source 520 (providing input voltage 521 such as a DC voltage), switch Q11, switch Q12, inductor 525 (such as associated with assembly 300), and output capacitor 535. As further discussed herein, ON and OFF states of switches Q11 and Q12 control a flow of current 522 through the inductor 525 and thus generation of the output voltage 523.

Although the voltage converter 565 in FIG. 5 is a buck converter configuration, note again that the voltage converter 565 and corresponding circuitry on or associated with substrate 410 and substrate 610 can be instantiated as any suitable type of voltage converter and include any number of phases, providing regulation as described herein.

As shown, the switch Q11 of voltage converter 565 is connected in series with switch Q12 between the input voltage source 520 and corresponding ground reference potential 599. The voltage converter 565 further includes inductor 525 extending from the node 596 to the output capacitor 535 and a dynamic load 118.

Via switching of the switches Q11 and Q12 based on respective control signals 505-1 (applied to gate G of switch Q11) and 505-2 (applied to gate G of switch Q12), node 596 coupling the source (S) node of switch Q11 and the drain (D) node of switch Q12 provides output current 122 through the inductor 525 (such as assembly 300), resulting in generation of the output voltage 523 (such as a DC output voltage) powering the load 118.

In one example, the controller 540 controls switching of the switches Q11 and Q12 based on one or more feedback parameters. For example, the controller 140 can be configured to receive output voltage feedback signal 523-1 derived from the output voltage 523 supplied to power the load 118. The output voltage feedback signal 523-1 can be the output voltage 523 itself or a proportional derivative thereof.

Via the comparator 550, the controller 540 compares the output voltage feedback signal 523-1 (such as output voltage 523 itself or derivative, or proportional signal) to the reference voltage 526. As previously discussed, the reference voltage 526 is a desired setpoint in which to control a magnitude of the output voltage 523 during load-line regulation implemented by the voltage converter 565. Also, as previously discussed, during load-line regulation, a magnitude of the reference voltage 526 varies depending on the magnitude of the output current 122.

Based on comparison of the output voltage feedback signal 523-1 and the voltage reference 526 (setpoint reference voltage), the comparator 550 produces a respective error voltage 555 based on the difference between the output voltage feedback signal 523-1 and the reference voltage 526. A magnitude of the error voltage 555 generated by the comparator 550 varies depending upon the degree to which the magnitude of the output voltage 523 is in or out of regulation (with respect to the reference voltage 526).

As further shown, the PWM (Pulse Width Modulation) controller 560 of the controller 540 controls operation of switching the switches Q11 and Q12 based upon the magnitude of the error voltage 555. For example, if the error voltage 555 indicates that the output voltage 523 (of the voltage converter 565) becomes less than a magnitude of the reference voltage 526, the PWM controller 560 increases a duty cycle and/or frequency of activating the high side switch Q11 (thus decreasing a duty cycle of activating the low-side switch Q12) in a respective switch control cycle.

Conversely, if the error voltage 555 indicates that the output voltage 523 (of the voltage converter 565) becomes greater than a magnitude of the reference voltage 525, the PWM controller 560 decreases a duty cycle and/or frequency of activating the high side switch Q11 (thus increasing a duty cycle of activating the low-side switch Q12) in a respective switching control cycle.

As is known in the art, the controller 540 controls each of the switches Q11 and Q12 ON and OFF at different times to prevent short-circuiting of the input voltage 521 to the ground reference voltage (i.e., ground reference potential 599). For example, when the switch Q11 is activated to an ON state, the switch Q12 is deactivated to an OFF state. Conversely, when the switch Q11 is deactivated to an OFF state, the switch Q12 is activated to an OFF state. Note that the controller 240 implements a dead time between state ON-OFF and OFF-ON state transitions to prevent shorting of the input voltage 521 to the ground reference.

Via variations in the pulse with modulation of controlling the respective switches Q11 and Q12, the controller 140 controls generation of the output voltage 523 such that the output voltage 523 remains within a desired voltage range with respect to the reference voltage setpoint 526.

Figure 6A:
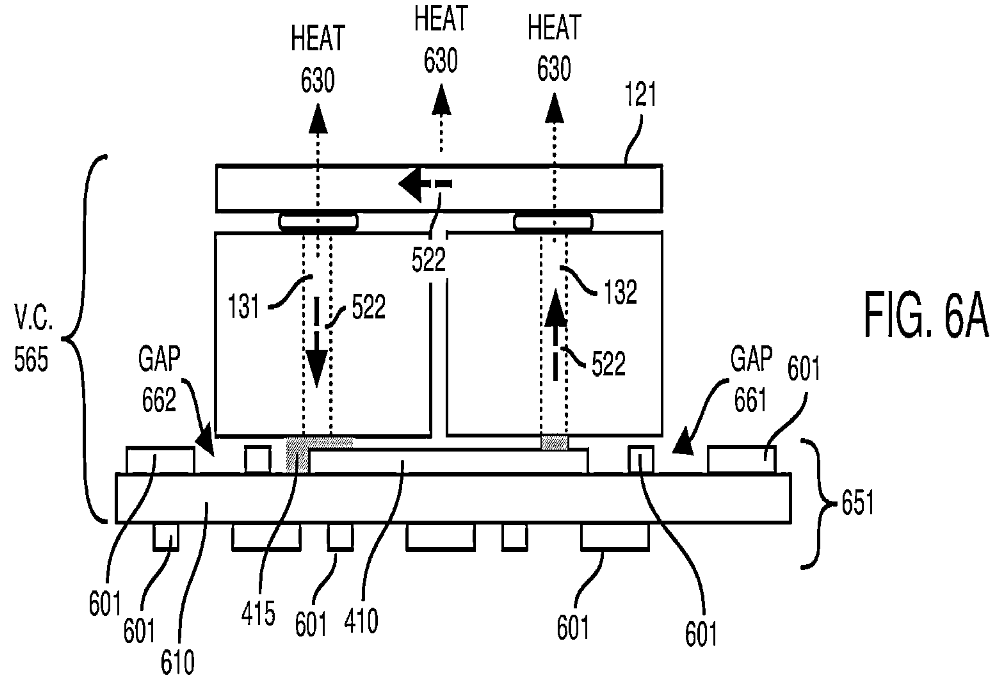
FIG. 6A is an example diagram illustrating control of a flow of current through an inductor assembly via circuit components disposed on one or more circuit boards as described herein.
Figure 6B:
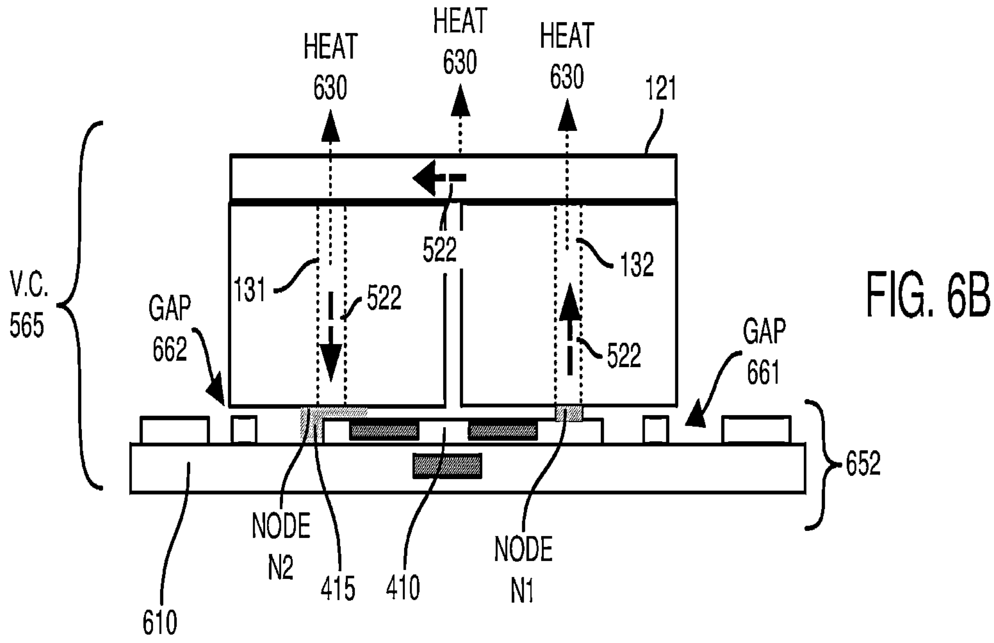
FIG. 6B is an example diagram illustrating control of a flow of current through an inductor assembly via circuit components embedded in or on one or more circuit boards as described herein.

FIG. 6A is an example diagram illustrating control of a flow of current through an inductor assembly via circuit components disposed on one or more circuit boards as described herein. FIG. 6B is an example diagram illustrating control of a flow of current through an inductor assembly via circuit components embedded in one or more circuit boards as described herein.

In this example, the substrate 410 of the assembly 400 is affixed to the substrate 610. An electrically conductive component such as electrically conductive path 415 provides electrical connectivity between an axial end of the element 131 and the substrate 610. If desired, the electrically conductive path 415 can be configured to provide electrical connectivity between the axial end of the element 131 and a node (such as surface pad) of the first substrate 410 as well.

As previously discussed, the element 132 includes axial end AE2-2 and axial end AE1-2; the axial end AE2-1 of the element 132 is fixedly coupled to the heat sink element 121; the axial end AE2-2 of the element 132 is connected to an input node N1 of power switch circuitry (such as switches Q11 and Q12) of a voltage converter 565 (a.k.a., power converter circuit.

The element 131 includes a first axial end AE1-1 and a second axial end AE1-2; the first axial end AE1-1 of the element 131 is fixedly coupled to the heat sink element 121; the second axial end AE1-2 of the element 132 is an output node (such as node N2) associated with the voltage converter 565. In such an instance, the heat sink element 121, the element 131, and the element 132 are disposed in an assembly 300 in which the element 132 is a first inductive path and the element 131 is a second inductive path. The first inductive path is connected in series with the second inductive path via a portion of the heat sink element 121 extending between the axial end AE2-2 of the element 132 and the axial end AE1-2 of the element 131 between node N1 and node N2.

Any of the circuitry or components (such as switch Q11, switch Q12, capacitor 535, controller 540, etc.) associated with the voltage converter 565 can be affixed to the substrate 410 or substrate 610. Additionally, or alternatively, any of the circuit components (such as switch Q11, switch Q12, capacitor 535, controller 540, etc.) can be embedded in the substrate 410 and/or substrate 610.

Accordingly, the circuit assembly 601 in FIG. 6A and circuit assembly 602 in FIG. 6B can be configured to include switch circuitry in which a first switch Q11 (such as a high side switch circuitry) is disposed in series with a second switch Q12 (such as low side switch circuitry). The input node N1 of the assembly 300 provides direct coupling to a node connecting the first switch Q11 and the second switch Q12. As previously discussed, driver circuitry such as pulse width modulation controller 560 drives each of the first switch Q11 and the second switch Q12 to convert the input voltage 521 into the output voltage 523. Thus, the controller 540 and corresponding switch circuitry (switch Q11 and Q12) can be: i) disposed on one or more surfaces of or embedded in the substrate 410 AND/OR ii) disposed on one or more surfaces of or embedded in the substrate 610 provide control for the flow of current 522 through a series combination of the element 132, the heat sink element 121, and the element 131 between node N1 and node N2.

Operation of the one or more components associated with the voltage converter in layer 652 may result in generation of heat generated by the voltage converter or corresponding components. For example, the heat 630 flows in a same direction of current 522 from the axial end AE2-2 (at node N1), through the element 132, to the heat sink 121. The heat 630 then flows from heat sink 121 into the air or other material in contact with the heat sink 121. Yet further, the heat 630 flows in an opposite direction of current 522 from the axial end AE1-2 (such as node N2), through the element 131, to the heat sink 121. The heat flows from heat sink 121 into the air or other material in contact with the heat sink 121. Thus, the element 132 is operative to convey heat 630 from the host substrate 410 or substrate 610 to the heat sink element 121; element 131 is then operative to convey heat 630 from the host substrate 410 or substrate 610 to the heat sink element 121.

Accordingly, the example assemblies in FIG. 6A and FIG. 6B can be configured to include magnetic permeable material enveloping the element 131 and the element 132. The one or more circuit components coupled to or embedded in the substrate 410 or substrate 610 control a flow of current through a series circuit path of the element 132, the heat sink element 121, and the element 131 between node N1 and node N2. The substrate 610 may be affixed to the first substrate 410. Note that the assemblies in FIGS. 6A and 6B include gap 661, gap 662, etc., disposed between the magnetic permeable material and the substrate 610. Any of one or more circuit components can be configured to reside in the gap 661, gap 662, etc.

Figure 7:
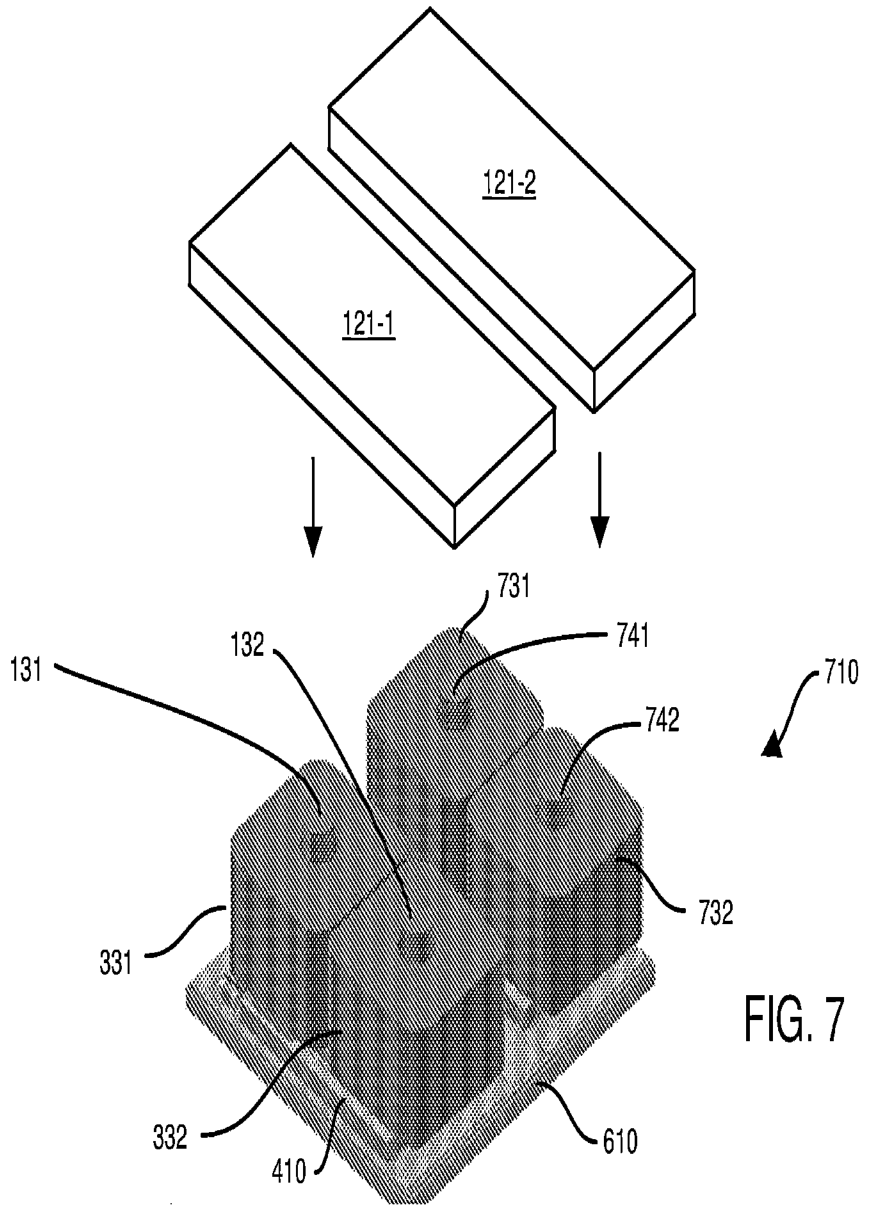
FIG. 7 is an example diagram illustrating implementation of multiple inductive paths via multiple heat sink assemblies and corresponding power converters as described herein.

FIG. 7 is an example diagram illustrating implementation of multiple inductive paths via multiple heat sink assemblies as described herein.

As shown, the assembly 710 (such as one or more power converter phases) can be configured to include any number instances of the assembly 400 coupled to the substrate 610.

In this example assembly 710, the first instance of the heat sink element 121-1 is coupled to the (top side, exposed) axial ends of the elements 131 and 132; the second instance of the heat sink element 121-2 is coupled to the axial ends of the elements 741 and 742.

In a similar manner as previously discussed, the magnetic permeable material 331 envelops the element 131; the magnetic permeable material 332 envelops the element 132; the magnetic permeable material 731 envelops the element 741; the magnetic permeable material 732 envelops the element 742; and so on.

Figure 8:
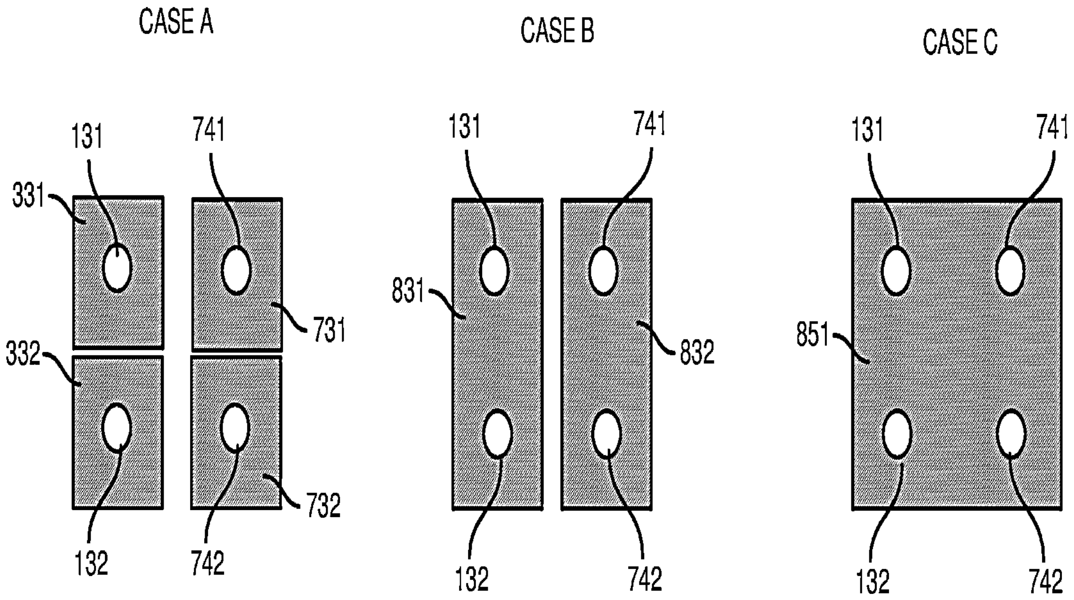
FIG. 8 is an example diagram illustrating different possible partitioning of magnetic permeable material to support multiple heat sink assemblies as described herein.

FIG. 8 is an example diagram illustrating different possible partitioning of magnetic permeable material to support multiple heat sink assemblies as described herein.

Note that the magnetic permeable material of the assembly 700 as discussed herein can be implemented in accordance with different partitions.

For example, in case A, the magnetic permeable material is partitioned such that a separate respective block of magnetic permeable material envelops each of the elements of electrically conductive material passing through it.

In case B, a first pair of elements (such as element 131 and element 132) pass through a respective cavities in block of magnetic permeable material 831. A second pair of element (such as element 741 and element 742) pass through cavities in the block of magnetic permeable material 832.

In case C, each of the elements (such as element 131, element 132, element 741, and element 742) passes through a respective block of magnetic permeable material 851.

FIG. 9A is an example exploded 3-D diagram illustrating multiple components to fabricate a respective inductor assembly as described herein.

In this example implementation, an inductor component includes magnetic permeable material 911, magnetic permeable material 913, and electrically conductive path 912 (such as omega-shaped) fabricated from metal or other suitable material.

Magnetic permeable material 913 includes respective cavity 923. Electrically conductive path 912 includes void 922.

Assembly of a respective inductor device 950 is shown in FIG. 9B.

FIG. 9B is an example assembled 3-D diagram illustrating a fabricated inductor assembly as described herein.

In this example, the inductor device 950 includes magnetic permeable material 911 disposed in the void 922 of the electrically conductive path 912. The combination of magnetic permeable material 911 and electrically conductive path 912 reside in the cavity 923 of the magnetic permeable material 913. In a similar manner as previously discussed, the combination of the magnetic permeable material 911 and magnetic permeable material 913 envelops each of the vertical portions of the electrically conductive path 912.

As further shown, the inductor 950 includes first terminal end 991 and second terminal end 992. If desired, the heat sink element 121 can be coupled in contact with the exposed top surface 961 of the inductor device 950.

Figure 10A:
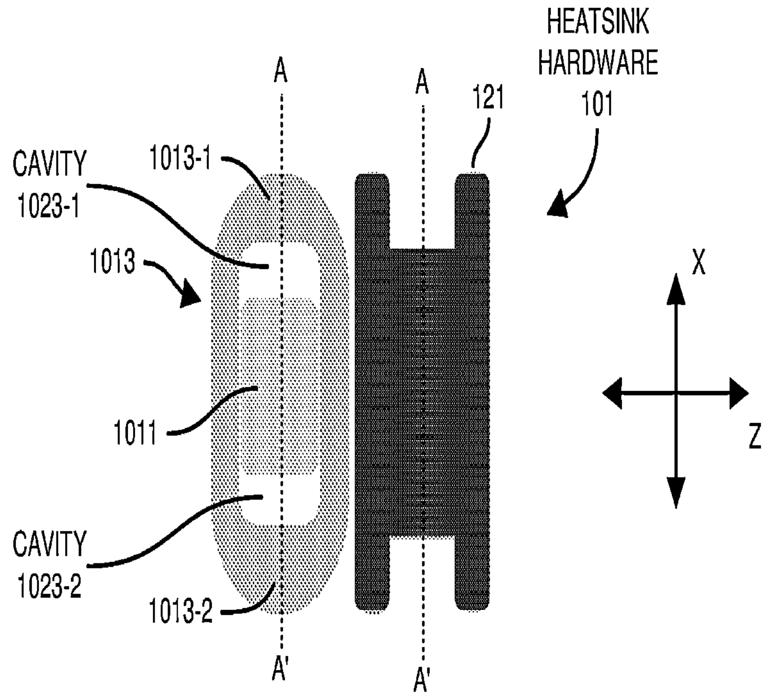
FIG. 10A is an example top view diagram illustrating components to fabricate an inductor assembly as described herein.

FIG. 10A is an example top view diagram illustrating components to fabricate an inductor assembly as described herein.

In this example implementation, inductor components include magnetic permeable material 1011, magnetic permeable material 1013, and heat sink hardware 101. As previously discussed, the heat sink hardware 101 is fabricated from metal or other suitable material.

Magnetic permeable material 1011 resides within a cavity of the magnetic permeable material 1013 between the first end 1013-1 and second end 1013-2. The insertion of magnetic permeable material 1011 in the cavity of magnetic permeable material 1013 results in cavity 1023-1 and cavity 1023-2.

Figure 10B:
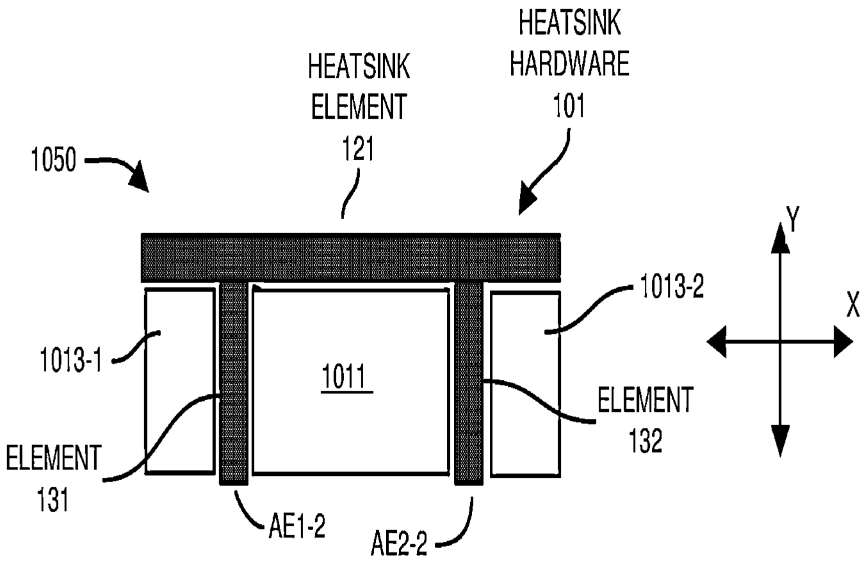
FIG. 10B is an example side view diagram illustrating a fabricated inductor assembly as described herein.

Assembly of a respective inductor device is shown in FIG. 10B, which includes insertion of the element 131 into cavity 1023-1 and element 132 into cavity 1023-2.

FIG. 10B is an example cutaway side view diagram illustrating a fabricated inductor assembly as described herein.

In this example, the mass of magnetic permeable material 1011 is disposed between the first element 131 of electrically conductive material and the second element 132 of electrically conductive material. As previously discussed, the second mass of magnetic permeable material 1013 includes a cavity 1023 (hollow volume). Occupation of magnetic permeable material 1011 in the cavity of the magnetic permeable material 1013 produces cavity 1023-1 and cavity 1023-2. The fabricator 150 inserts element 131 into cavity 1023-1 and element 132 into cavity 1023-2.

Thus, the resulting inductor device 1050 in FIG. 10B includes a combination of the first element 131, the first mass of magnetic permeable material 1011, and the second element 132 residing in the core (cavity 1023) of the magnetic permeable material 1013. Each of the element 131 and element 132 are surrounded by a combination of magnetic permeable material 1011 and magnetic permeable material 1013.

Figure 11:
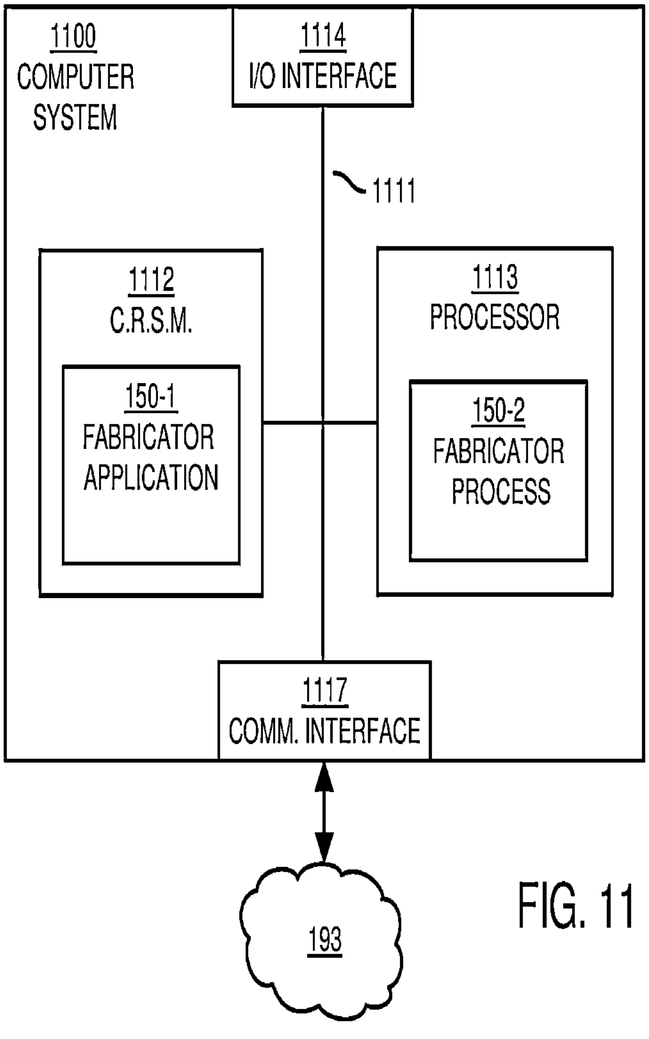
FIG. 11 is an example diagram illustrating computer processor hardware (such as fabrication equipment) and related software instructions that execute one or more fabrication methods according to embodiments herein.

FIG. 11 is an example diagram illustrating computer processor hardware (such as implementation in fabrication equipment) and related software instructions that execute one or more fabrication methods as discussed herein.

As shown, computer system 1100 (such as implemented by any of one or more resources such as a fabricator) of the present example includes an interconnect 1111 that couples computer readable storage media 1112 such as a non-transitory type of media (or hardware storage media) in which digital information can be stored and retrieved, a processor 1113 (e.g., computer processor hardware such as one or more processor devices), I/O interface 1114 (e.g., to output control signals to the power converter phases, monitor current, etc.), and a communications interface 1117.

I/O interface 1114 provides connectivity to any suitable equipment such as equipment operative to produce any of the assemblies as discussed herein.

Computer readable storage medium 1112 can be any hardware storage resource or device such as memory, optical storage, hard drive, floppy disk, etc. The computer readable storage medium 1112 stores instructions and/or data used by the fabricator application 150-1 to perform any of the operations as described herein.

Further in this example, communications interface 1117 enables the computer system 1100 and processor 1113 to communicate over a resource such as network 190 to retrieve information from remote sources and communicate with other computers.

As shown, computer readable storage media 1112 (such as computer-readable storage hardware) is encoded with fabricator application 150-1 (e.g., software, firmware, etc.) executed by processor 1113. Fabricator application 150-1 can be configured to include instructions to implement any of the operations as discussed herein.

During operation, processor 1113 may access computer readable storage media 1112 via the use of interconnect 1111 in order to launch, run, execute, interpret or otherwise perform the instructions in fabricator application 150-1 stored on computer readable storage medium 1112.

Execution of the fabricator application 150-1 produces processing functionality such as fabricator process 150-2 in processor 1113. In other words, the fabricator process 150-2 associated with processor 1113 represents one or more aspects of executing fabricator application 150-1 within or upon the processor 1113 in the computer system 1100.

In accordance with different examples, note that computer system 1100 can be a micro-controller device, logic, hardware processor, hybrid analog/digital circuitry, etc., configured to control a power supply and perform any of the operations as described herein.

Functionality supported by the different resources will now be discussed via flowchart in FIG. 12. Note that the steps in the flowcharts below can be executed in any suitable order.

Figure 12:
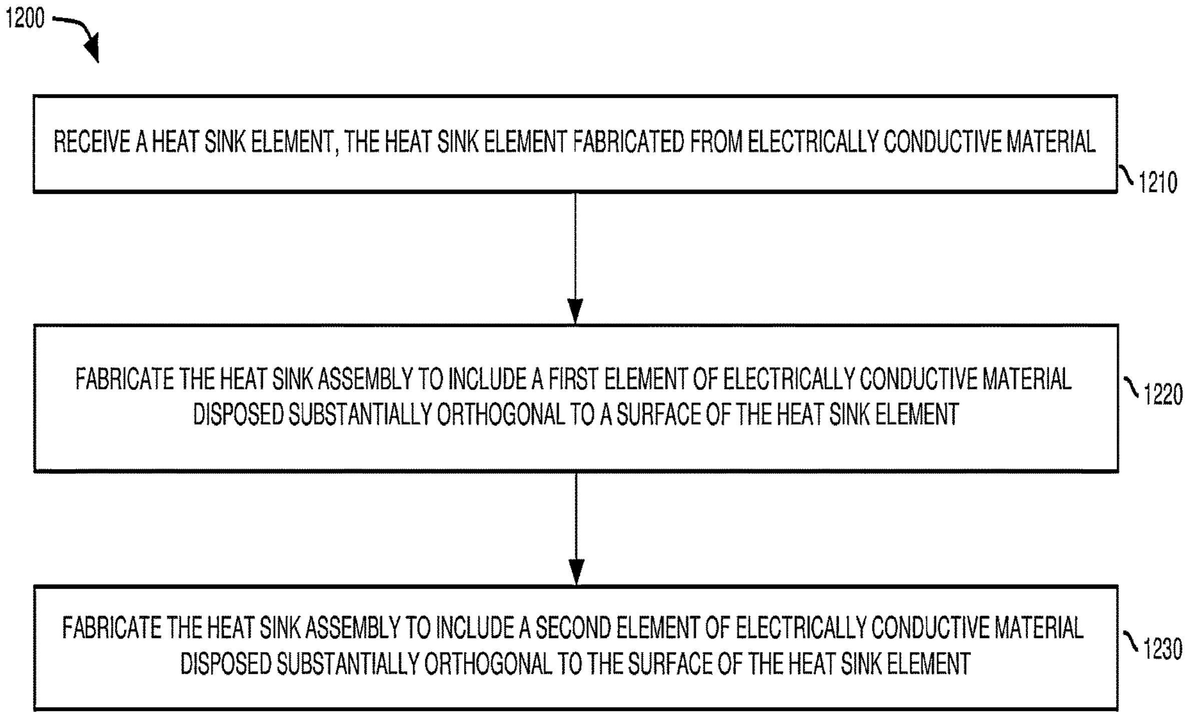
FIG. 12 is an example diagram illustrating a fabrication method according to embodiments herein.

FIG. 12 is a flowchart 1200 illustrating an example method as discussed herein. Note that there will be some overlap with respect to concepts as discussed above.

In processing operation 1210, the fabricator 150 receives a heat sink element. The heat sink element may be fabricated from or comprise electrically conductive material such as malleable metal.

In processing operation 1220, the fabricator 150 fabricates the heat sink assembly to include a first element of electrically conductive material disposed substantially orthogonal to a surface of the heat sink element.

In processing operation 1230, the fabricator 150 fabricate the heat sink assembly to include a second element of electrically conductive material disposed substantially orthogonal to the surface of the heat sink element.

Figure 13A:
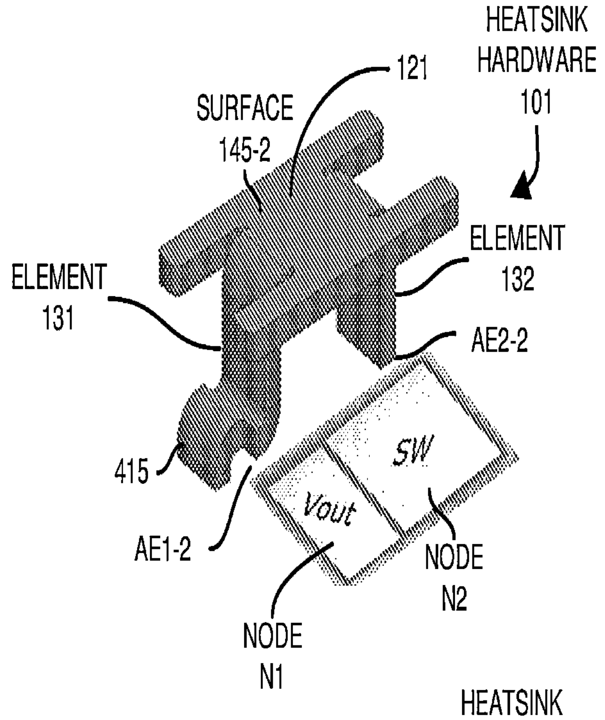
FIG. 13A is an example 3-D view diagram illustrating attributes of heat sink hardware as discussed herein.

FIG. 13A is an example 3-D view diagram illustrating attributes of a heat sink hardware configuration as discussed herein.

In this example, as previously discussed, the heat sink hardware 101 (such as fabricated from metal) includes element 131 and element 132. Additionally, in a similar manner as previously discussed, heat sink hardware 101 can be configured to provide electrical connectivity between the axial end AE1-2 of the element 131 to the electrically conductive path 415 (such as fabricated from metal); the electrically conductive path 415 can be connected to node N1. Yet further, the fabricator 150 can be configured to provide electrical connectivity between the axial end AE2-2 of the element 132 to the node N2.

Figure 13B:
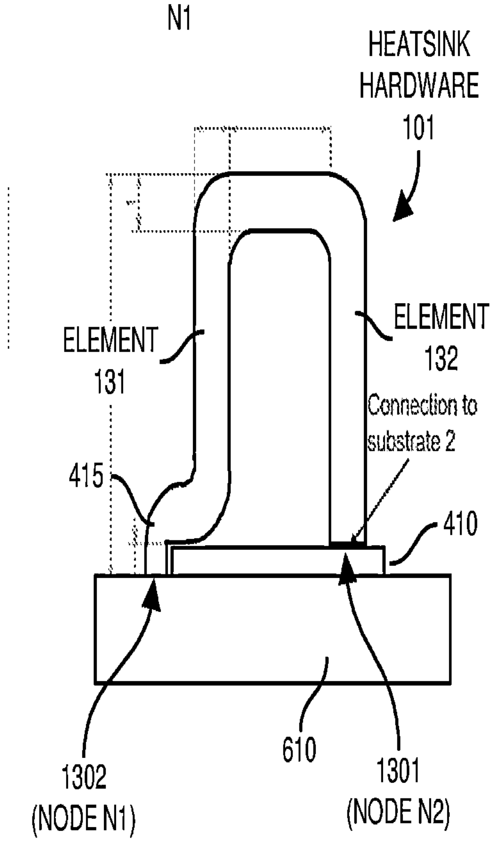
FIG. 13B is an example side view diagram illustrating attributes of a heat sink assembly or heat sink hardware as discussed herein.

FIG. 13B is an example side view diagram illustrating attributes of a heat sink assembly or heat sink hardware as discussed herein.

In this side view example, the axial end of element 132 is connected to the substrate 410 via connection 1301 (such as node N2). The axial end of element 131 is connected to electrically conductive path 415 at a first terminal. A second terminal of the electrically conductive path 415 connects to the substrate 610 via connection 1302 (node N1).

Note again that techniques herein are well suited for use in circuit assembly applications. However, it should be noted that the disclosure of matter herein is not limited to use in such applications and that the techniques discussed herein are well suited for other applications as well.

While this invention has been particularly shown and described with references to preferred aspects thereof, it will be understood by those skilled in the art that various changes in form and details may be made therein without departing from the spirit and scope of the present application as defined by the appended claims. Such variations are intended to be covered by the scope of this present application. As such, the foregoing description in the present disclosure is not intended to be limiting. Rather, any limitations to the invention are presented in the following claims.

The invention claimed is:

1. An apparatus comprising:

a heat sink element fabricated from a first portion of electrically conductive material;

a first inductive path fabricated from a second portion of the electrically conductive material, the second portion of the electrically conductive material fixedly connected to the heat sink element;

a second inductive path fabricated from a third portion of the electrically conductive material, the third portion of the electrically conductive material fixedly connected to the heat sink element;

wherein the second portion of the electrically conductive material and the third portion of the electrically conductive material extend substantially orthogonal from a first surface of the heat sink element;

wherein a series connectivity of the first inductive path, the heat sink element, and the second inductive path is an inductor device; and wherein axial ends of the heat sink element extend in a plane beyond the second portion of the electrically conductive material and the third portion of the electrically conductive material.

2. The apparatus as in claim 1 further comprising:

magnetic permeable material including: i) a first void extending between a first surface of the magnetic permeable material and a second surface of the magnetic permeable material; and ii) a second void extending between the first surface of the magnetic permeable material and the second surface of the magnetic permeable material;

wherein the second portion of the electrically conductive material resides in the first void in the magnetic permeable material; and wherein the third portion of the electrically conductive material resides in the second void in the magnetic permeable material.

3. The apparatus as in claim 1, wherein the second portion of the electrically conductive material includes a first axial end and a second axial end, the first axial end of the second portion fixedly coupled to the heat sink element, the second axial end of the second portion being an input node connected to power switch circuitry of a power converter circuit; and wherein the third portion of the electrically conductive material includes a first axial end and a second axial end, the first axial end of the third portion fixedly coupled to the heat sink element, the second axial end of the third portion being an output node associated with the power converter circuit.

4. The apparatus as in claim 3, wherein the series connectivity of the first inductive path, the heat sink element, and the second inductive path extend between the second axial end of the second portion and the second axial end of the third portion.

5. The apparatus as in claim 3, wherein the switch circuitry includes a first switch disposed in series with a second switch, the input node directly coupling the first switch to the second switch, the apparatus further comprising:

driver circuitry to drive each of the first switch and the second switch.

6. The apparatus as in claim 1 further comprising:

a host substrate;

wherein the second portion includes a first axial end and a second axial end, the first axial end of the second portion fixedly coupled to the heat sink element, the second axial end of the second portion fixedly connected to a first node of the host substrate; and wherein the third portion includes a first axial end and a second axial end, the first axial end of the third portion fixedly coupled to the heat sink element, the second axial end of the third portion being fixedly connected to a second node of the host substrate.

7. The apparatus as in claim 6, wherein the second portion of the electrically conductive material is operative to convey heat from the host substrate to the heat sink element; and wherein the third portion of the electrically conductive material is operative to convey heat from the host substrate to the heat sink element.

8. The apparatus as in claim 1, wherein the heat sink element includes a first void resulting from bending of the second portion with respect to the a plane in which the heat sink element resides; and wherein the heat sink element includes a second void resulting from bending of the third portion with respect to the plane in which the heat sink element resides.

9. The apparatus as in claim 1 further comprising:

a first substrate;

wherein the second portion of the electrically conductive material is enveloped by first magnetic permeable material;

wherein the third portion of the electrically conductive material is enveloped by second magnetic permeable material; and wherein an axial end of the second portion contacts a first pad disposed on a surface of the first substrate.

10. The apparatus as in claim 9 further comprising:

a second substrate to which the first substrate is affixed; and an electrically conductive path of metal operative to provide electrical connectivity between an axial end of the third portion and the second substrate.

11. The apparatus as in claim 10, wherein the electrically conductive path of metal is further operative to provide electrical connectivity between the axial end of the third portion and a second node on the surface of the first substrate.

12. The apparatus as in claim 1 further comprising:

magnetic permeable material enveloping the second portion of the electrically conductive material and the third portion of the electrically conductive material;

a first substrate to which a first axial end of the second portion is coupled;

first circuit components coupled to the first substrate, the first circuit components operative to control a flow of current through the inductor device;

a second substrate to which the first substrate is affixed;

a gap between the magnetic permeable material and the second substrate; and a second circuit component coupled to the second substrate and residing within the gap.

13. The apparatus as in claim 1 further comprising:

a host substrate; and switch circuitry embedded in the host substrate, the switch circuitry operative to control a flow of current through the inductor device.

14. The apparatus as in claim 1 further comprising:

a first substrate;

a second substrate coupled to the first substrate;

wherein an axial end of the second portion of the electrically conductive material is directly coupled to a first node, the first node disposed on the first substrate; and wherein an axial end of the third portion of the electrically conductive material is directly coupled to a second node, the second node disposed on the second substrate.

15. The apparatus as in claim 14, wherein the second substrate includes switch circuitry operative to control flow of current from the first node through the inductor device to the axial end of the third portion of the electrically conductive material.

16. The apparatus as in claim 15, wherein the controlled flow of current produces an output voltage supplied from the axial end of the third portion of the electrically conductive material to the second node of the first substrate.

17. The apparatus as in claim 1, wherein the first inductive path is surrounded by first magnetic permeable material; and wherein the second inductive path is surrounded by second magnetic permeable material.

18. The apparatus as in claim 17, wherein the first inductive path is oriented to be substantially parallel to the second inductive path; and wherein the series connectivity of the first inductive path, the heat sink element, and the second inductive path is operative to support flow of current from a first surface of a host substrate through the series connectivity back to the first surface of the host substrate.

19. An inductor device comprising:

a heat sink element fabricated from electrically conductive material;

a first element of electrically conductive material fixedly connected to the heat sink element, the first element extending substantially orthogonal with respect to a first surface of the heat sink element;

a second element of electrically conductive material fixedly connected to the heat sink element, the second element extending substantially orthogonal with respect to the first surface of the heat sink element;

a first mass of magnetic permeable material disposed between the first element of electrically conductive material and the second element of electrically conductive material; and a second mass of magnetic permeable material including a hollow volume in which a combination of the first element, the first mass of magnetic permeable material, and the second element resides; and wherein axial ends of the heat sink element extend in a plane beyond the first element and the second element.

20. The inductor device as in claim 19, wherein the heat sink element includes a second surface disposed opposite the first surface, the second surface exposed on a top surface of the inductor device.

21. The inductor device as in claim 19, wherein the first element is fabricated via a first bend in the electrically conductive material; and wherein the second element is fabricated via a second bend in the electrically conductive material.

22. The inductor device as in claim 19, wherein a height of the first mass of magnetic permeable material is shorter than a height of the second mass of magnetic permeable material.

23. The inductor device as in claim 19, wherein the first element is disposed between the first mass of magnetic permeable material and a first portion of the second mass of magnetic permeable material;

wherein the second element is disposed between the first mass of magnetic permeable material and a second portion of the second mass of magnetic permeable material; and wherein the second portion of the second mass of magnetic permeable material is disposed opposite the first portion of the second mass of magnetic permeable material.

24. The inductor device as in claim 23, wherein the first element is a first inductive element; wherein the second element is a second inductive element; and wherein the heat sink element connects the first inductive element and the second conductive element in series between a terminal of the first element and a terminal of the second element.

25. A method of producing a heat sink assembly, the method comprising:

receiving a heat sink element, the heat sink element fabricated from electrically conductive material;

fabricating the heat sink assembly to include a first element of electrically conductive material disposed substantially orthogonal to a surface of the heat sink element;

fabricating the heat sink assembly to include a second element of electrically conductive material disposed substantially orthogonal to the surface of the heat sink element; and wherein a series connectivity of the first element, the heat sink element, and the second element is an inductor component; and wherein axial ends of the heat sink element extend in a plane beyond the first element and the second element.

26. The method as in claim 25, wherein the first element is a first bent portion of the electrically conductive material from which the heat sink element is fabricated; and wherein the second element is a second bent portion of the electrically conductive material from which the heat sink element is fabricated;

the method further comprising:

inserting the first element of electrically conductive material of the heat sink assembly through a first void disposed in first magnetic permeable material; and inserting the second element of electrically conductive material of the heat sink assembly through a second void disposed in second magnetic permeable material.

* * * * *